(12) United States Patent
Kobayashi (10) Patent No.: US 11,699,280 B2
(45) Date of Patent: Jul. 11, 2023

(54) IMAGING APPARATUS, METHOD, AND STORAGE MEDIUM FOR DETERMINING AN EXPOSURE CONDITION FOR A REGION HAVING SELECTED PIXEL OR REGION WITH A LUMINANCE DIFFERENT FROM NOT SELECTED PIXEL OR REGION

(71) Applicant: CANON KABUSHIKI KAISHA, Tokyo (JP)

(72) Inventor: Shigeyuki Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/322,673

(22) Filed: May 17, 2021

(65) Prior Publication Data

US 2021/0368084 A1  Nov. 25, 2021

(30) Foreign Application Priority Data

May 21, 2020  (JP) .................................. 2020-088897

(51) Int. Cl.
*G06V 10/60* (2022.01)
*H04N 23/71* (2023.01)

(52) U.S. Cl.
CPC ............. *G06V 10/60* (2022.01); *H04N 23/71* (2023.01)

(58) Field of Classification Search
CPC ............. H04N 5/2351; H04N 5/23245; H04N 5/2352; H04N 5/35554; H04N 23/71; H04N 23/667; H04N 23/72; H04N 25/583; G06V 10/60
See application file for complete search history.

(56) References Cited

U.S. PATENT DOCUMENTS

| | | | | |
|---|---|---|---|---|
| 2012/0050565 A1* | 3/2012 | Imai | ..................... | H04N 5/2353 348/E9.052 |
| 2013/0163813 A1* | 6/2013 | Shoji | ....................... | G06T 11/60 382/103 |
| 2014/0168463 A1* | 6/2014 | Tamura | .................. | H04N 9/735 348/223.1 |
| 2017/0324909 A1* | 11/2017 | Choi | ..................... | H04N 5/2355 |
| 2018/0097988 A1* | 4/2018 | Tsuchiya | ................ | H04N 5/243 |

FOREIGN PATENT DOCUMENTS

JP  2010136205 A  6/2010

* cited by examiner

*Primary Examiner* — Luong T Nguyen
(74) *Attorney, Agent, or Firm* — Canon U.S.A., Inc., IP Division (57) ABSTRACT

An apparatus includes an imaging unit configured to capture an image of a subject formed on a surface having an array of a plurality of pixels, an acceptance unit configured to accept a designation of a pixel or a region including a plurality of pixels on the surface, a determination unit configured to determine an exposure of the pixel or the accepted region to have a predetermined luminance, and to determine an exposure of other pixels or other regions according to a distance from the pixel or the accepted region on the surface, and an output unit configured to output an image signal captured by the imaging unit at the determined exposure.

15 Claims, 6 Drawing Sheets

IMAGING APPARATUS, METHOD, AND STORAGE MEDIUM FOR DETERMINING AN EXPOSURE CONDITION FOR A REGION HAVING SELECTED PIXEL OR REGION WITH A LUMINANCE DIFFERENT FROM NOT SELECTED PIXEL OR REGION

BACKGROUND

Field of the Disclosure

The aspect of the embodiments relates to an imaging apparatus, a method, and a storage medium.

Description of the Related Art

There has been conventionally known an imaging apparatus that is capable of setting an exposure amount of each pixel in an image sensing element (Japanese Patent Application Laid-Open No. 2010-136205). This imaging apparatus sets the exposure amount of each pixel for full-scale imaging from the results of preliminary imaging so that the sensitivity can be changed in accordance with the luminance of a subject.

SUMMARY

An apparatus includes an imaging unit configured to capture an image of a subject formed on a surface having an array of a plurality of pixels, an acceptance unit configured to accept a designation of a pixel or a region including a plurality of pixels on the surface, a determination unit configured to determine an exposure of the pixel or the accepted region to have a predetermined luminance, and to determine an exposure of other pixels or other regions according to a distance from the pixel or the accepted region on the surface, and an output unit configured to output an image signal captured by the imaging unit at the determined exposures.

DESCRIPTION OF THE EMBODIMENTS

Hereinafter, exemplary embodiments for carrying out the disclosure will be described in detail with reference to the attached drawings. The exemplary embodiments described below are examples of means for implementing the disclosure and should be modified or altered as appropriate depending on the configuration of an apparatus to which the disclosure is applied and various conditions. The disclosure is not limited to the following exemplary embodiments. In addition, all the combinations of features described in relation to the exemplary embodiments are not necessarily essential to the solution of the disclosure.

Figure 1:
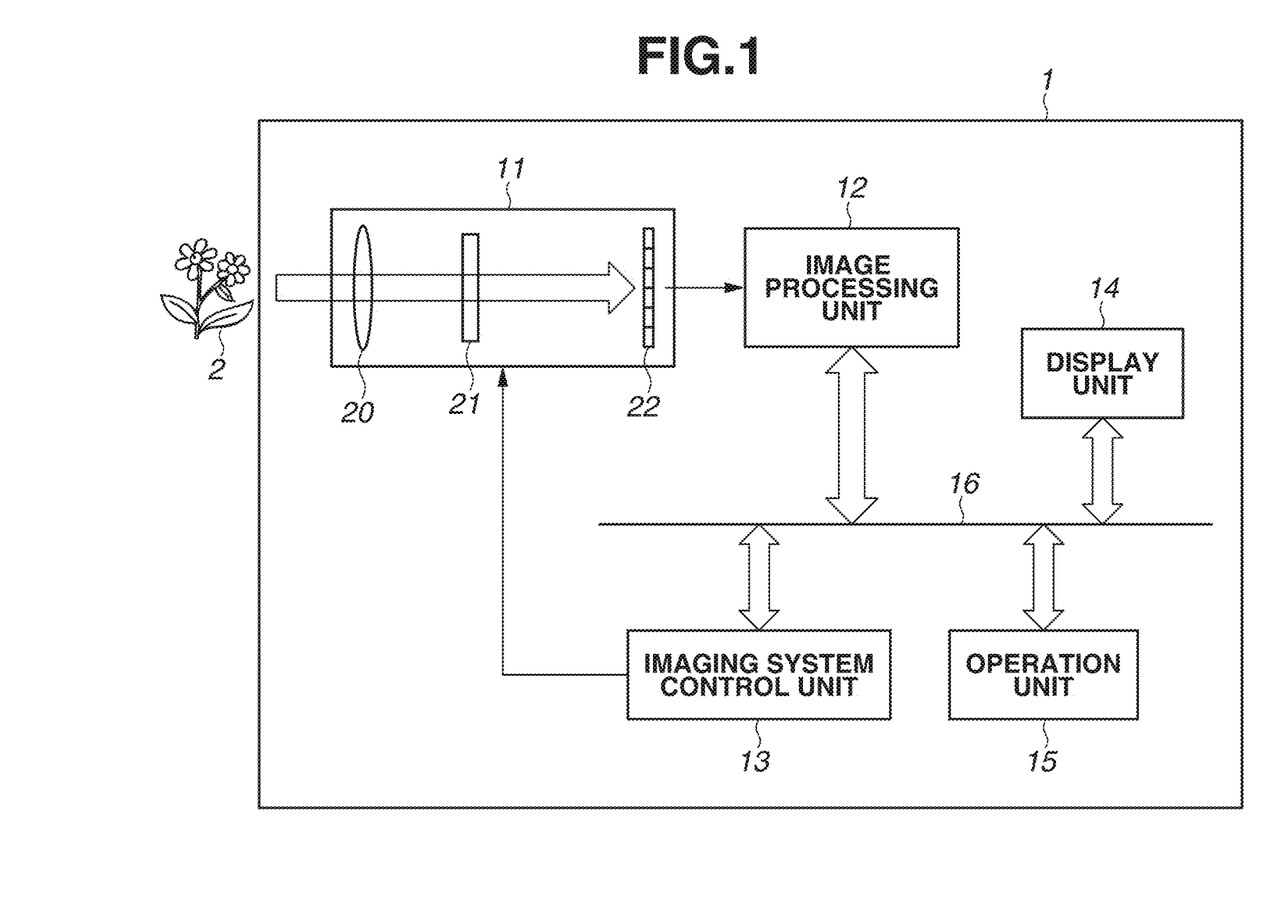
FIG. 1 is a block diagram illustrating a configuration example of an imaging apparatus according to a first exemplary embodiment.

FIG. 1 is a block diagram illustrating a configuration example of an imaging apparatus 1 according to a first exemplary embodiment.

The imaging apparatus 1 includes an imaging system 11 that captures an image of a subject 2, an image processing unit 12 that processes the image captured by the imaging system 11, an imaging system control unit 13 that controls the imaging system 11, a display unit 14 that has a display screen, and an operation unit 15 for a user to input operations. The image processing unit 12, the imaging system control unit 13, the display unit 14, and the operation unit 15 are connected one another by a bus 16 so that they can mutually communicate.

The imaging system 11 includes a solid-state image sensing element 22 that can control exposure conditions (for example, gain and shutter speed) for each pixel or each region, an image formation optical system 20 that causes an image of the subject 2 to be formed on the solid-state image sensing element 22, and an aperture 21. The image formation optical system 20 is illustrated as one lens in the drawing for the sake of simplified description, but can include a plurality of lenses such as a zoom lens, a focus lens, and a shake correction lens. The imaging system 11 can include an optical low pass filter that shuts off short-wavelength light, an infrared (IR) cut filter that shuts off long-wavelength light and so on.

The image processing unit 12 converts an image signal from the solid-state image sensing element 22 into digital data by analog-to-digital (A/D) conversion, and then subjects the digital data to signal processing including demosaicing processing, white balance processing, gamma processing, and the like, to generate a digital image.

The imaging system control unit 13 drives the image formation optical system 20 for zooming or focusing, controls the opening diameter of the aperture 21, and controls the exposure conditions (for example, gain and shutter speed) for each pixel or each region of the solid-state image sensing element 22. The imaging system control unit 13 controls the imaging system 11 based on an evaluation value (a value calculated by a predetermined calculation formula based on the intensity and contrast of the image signal) for each pixel or each region calculated from the digital image by the image processing unit 12.

The display unit 14 is a cathode ray tube (CRT) display, a liquid crystal display, or an organic electro luminescence (EL) display, which displays a digital image or the like generated by the image processing unit 12. Besides the digital image, the display unit 14 also displays the current imaging conditions (aperture, gain, shutter speed, and the like), focus measuring frame, and photometric frame, which are superimposed on the digital image. The display unit 14 can include a publicly known touch screen.

The operation unit 15 is a device for the user to input an instruction, which includes, for example, buttons, a mode dial for selecting an imaging mode, a cross key, and a touch panel provided on the display unit 14. In the present exemplary embodiment, the operation unit 15 also sets the photometric frame for each pixel or each region. The operation unit 15 can also be called an input unit.

As described below, the image processing unit 12, the imaging system control unit 13, and the operation unit 15 acquire an image after setting the exposure conditions based on input information. Thus, the image processing unit 12, the imaging system control unit 13, and the operation unit 15 can also be collectively called an information processing unit.

<Overview of Operations>

The imaging apparatus 1 is capable of subject-emphasized imaging, in which an image with a specific subject (main subject) emphasized in a region designated by the user is to be captured, through control of the exposure conditions for each predetermined region in a screen.

Hereinafter, operations of subject-emphasized imaging by the imaging apparatus 1 of the present exemplary embodiment will be described.

In the present exemplary embodiment, the imaging apparatus 1 can be configured to perform subject-emphasized imaging at all times or can be configured to perform subject-emphasized imaging when being instructed by the user via the mode dial or the like of the operation unit 15. As the imaging modes, general imaging modes such as an AUTO mode in which the imaging conditions are automatically set, an aperture priority mode, a shutter speed priority mode, a gain priority mode, and a manual mode can be provided as well as the subject-emphasized imaging mode. Hereinafter, the operations of shifting from the AUTO mode set at the startup of the imaging apparatus to the subject-emphasized imaging mode by the user operating the mode dial or the like will be described as an example.

Figure 2A:
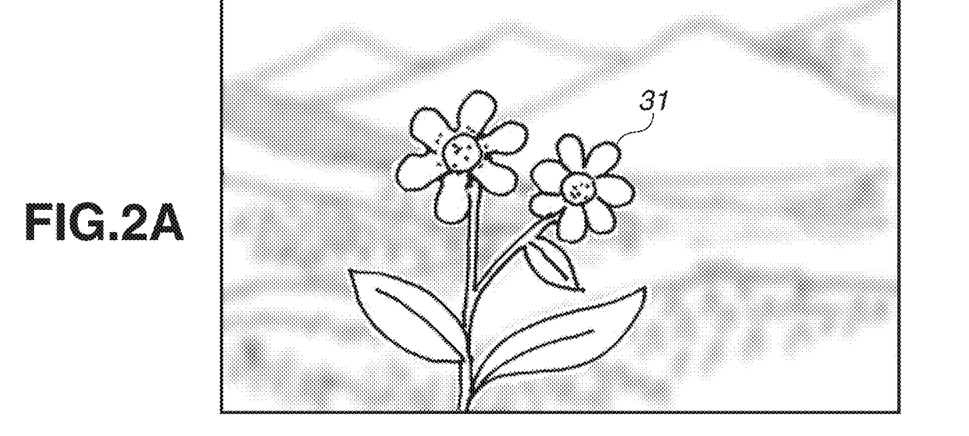
FIGS. 2A, 2B and 2C are images for describing an example of operations of the imaging apparatus.
Figure 2B:
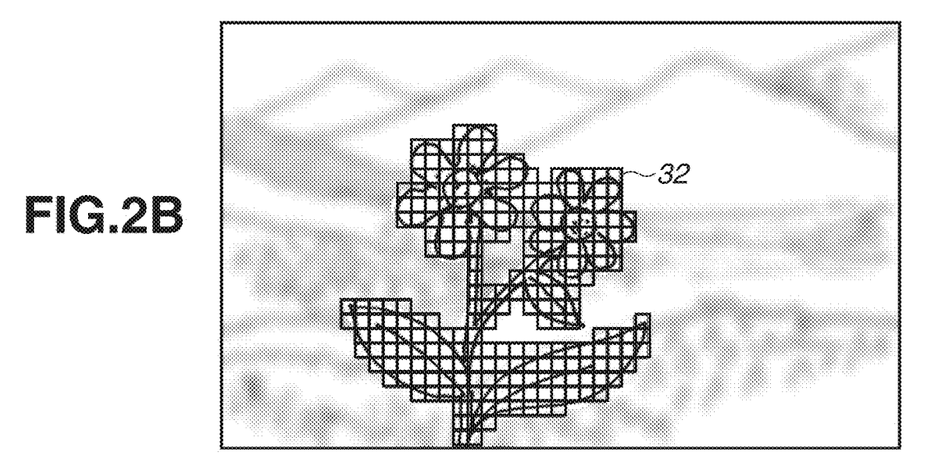
Figure 2C:
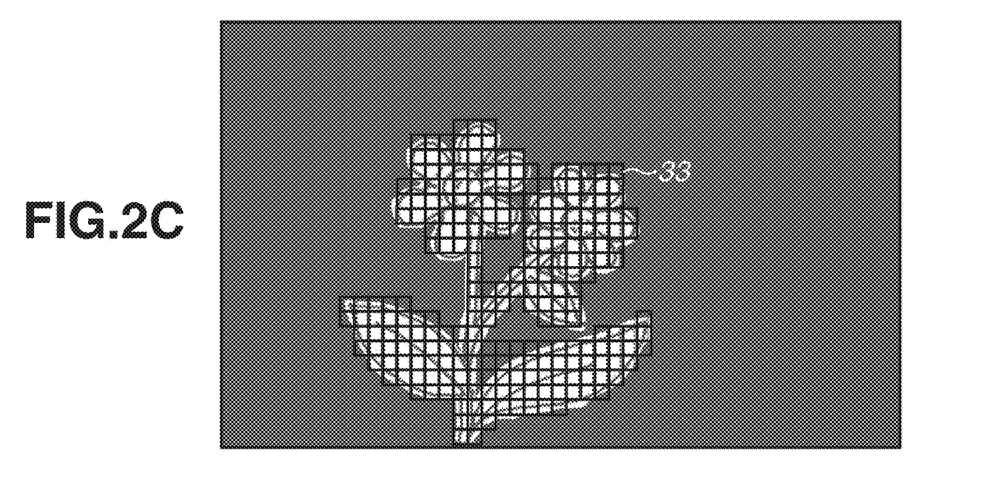

FIGS. 2A to 2C are images for describing an example of operations of the imaging apparatus 1.

FIG. 2A illustrates a composition intended by the user, and FIG. 2C illustrates a final version of the captured image intended by the user. As illustrated in FIG. 2A, a main subject 31 is a flower, and there is a small difference in luminance between the main subject 31 and its background.

When the user activates the imaging apparatus 1, the imaging apparatus 1 starts up in the AUTO mode. The imaging system control unit 13 adjusts the imaging conditions (aperture, shutter speed, gain, and the like) of the imaging system 11 such that an image to be captured is properly exposed.

In the following description, the photometric frame in the AUTO mode is laid in the entire screen. Otherwise, the photometric frame can be set in a predetermined center area of the screen, a photometric target can be located at one point in the center of an image, or a photometric method involving assignment of weights to evaluation values in the screen can be adopted.

In an image captured in a manner that the imaging system 11 is controlled in the AUTO mode and the exposure is properly adjusted, the difference in luminance between the main subject and the background is small. Thus, as illustrated in FIG. 2A, the main subject 31 and the background are both properly exposed.

<Emphasized Imaging Mode>

When the user selects the subject-emphasized imaging mode by the mode dial or the like of the operation unit 15, the imaging apparatus 1 causes an instruction to pop up on the display of the display unit 14 for prompting the user to select the main subject. In order to make a monitor image (through image) for selecting a composition easily viewable, this instruction can be continuously displayed in an area of the display where the through image is not displayed (for example, a region provided outside the screen for display of the imaging conditions).

While watching the through image displayed on the display unit 14, the user selects pixels or regions including the main subject (flower) 31 using the cross key in the operation unit 15, the touch panel, or the like. In the example described below, not pixels but regions are selected. Alternatively, pixels can be selected.

At the selection of regions, a plurality of regions including the main subject 31 can be selected one by one, or regions including the outline of the main subject 31 can be selected. Otherwise, if the operation unit 15 includes a touch panel, for example, the user can designate the outline of the main subject (flower) 31 by a finger or a pen, so that the regions included in the designated outline are recognized as the main subject 31.

In order to present the selected regions to the user, for example, outer frame lines 32 are superimposed on the captured image. In this case, the frame lines of all the selected regions can be displayed, or the lines of outer frames of the selected regions can be displayed to make the main subject 31 easier to see. FIG. 2B illustrates an example of a through image where the regions including the main subject 31 are selected by the user. In FIG. 2B, a plurality of regions 32 surrounded by black lines constitutes the regions including the main subject 31.

When the selection of the regions 32 including the main subject 31 is completed, the imaging system control unit 13 sets the exposure conditions of the imaging system 11 such that the regions 32 including the main subject 31 are properly exposed and the other regions are exposed at a level equal to or lower than a predetermined value with respect to the proper exposure (for example, the exposure at a level lower by a predetermined number of stages). That is, the imaging system control unit 13 lowers the exposure conditions for the regions other than the regions 32 including the main subject 31 (i.e., the background) by a predetermined value with respect to the exposure conditions for the regions 32 including the main subject 31. The predetermined value can be a fixed value preset to the image processing unit 12 or can be changed by the user. In one embodiment, the predetermined value is changed by the user because it is possible to suite various user preferences. In addition, if the exposure conditions for the background are lower than a predetermined lower limit value, the background will become darkened (underexposed). Thus, the imaging system control unit 13 can set the exposure conditions for the regions other than the regions including the main subject (i.e., the background) such that the exposure conditions are not lower than the predetermined lower limit value.

After the setting of the exposure conditions by the imaging system control unit 13 is completed, when the user instructs for start of imaging, an image signal captured by the solid-state image sensing element 22 under the set exposure conditions is supplied to the image processing unit 12, and the image processing unit 12 performs signal processing on the image signal to generate a digital image. That is, the image processing unit 12 acquires a digital image by performing signal processing on the image signal. The thus captured (acquired) image is as illustrated in FIG. 2C, for example, where regions 33 including the main subject 31 are properly exposed and the background is exposed at a level lowered by a predetermined value with respect to the exposure of the regions 33 including the main subject 31. This enables to generate an image of the main subject 31 with emphasis as intended by the user.

In a case where a solid-state image sensing element capable of controlling the exposure conditions for each pixel or each region is used, the exposure conditions can be set individually for the main subject and the background after all the pixels or all the regions in the screen are determined to represent the main subject or the background. However, it takes time to set the exposure conditions for all the pixels or all the regions. On the contrary, in the present exemplary embodiment, by selecting the pixels or the regions 32 including the main subject 31, the exposure conditions can be changed for the regions 32 including the main subject 31 and the other regions, which allows for quick setting of the regions targeted for emphasized imaging. That is, in the present exemplary embodiment, the exposure amounts can be set in an easy and simple manner. Accordingly, in the present exemplary embodiment, it is easy to capture an image as intended by the user.

The present exemplary embodiment is also applicable for a case where the main subject and the background are both dark and the background includes a moving object. For example, in a scene where the wind is blowing at night, it is assumed that the main subject is unilluminated cherry blossoms and the background includes vegetation swaying in the wind (the vegetation is not illuminated either).

In this case, even though the user selects the main subject less affected by the wind, the vegetation in the background may be swaying in the wind in the distance. In order to capture an image by a conventional camera in such a situation, it is necessary to perform a long exposure, for example, such that the main subject and the background are both properly exposed, and after the imaging, to reduce the exposure of the background by digital processing such as gradation correction. This may cause the vegetation in the background to be blurred due to the long exposure, which results in an image deviating from the user's intention. On the contrary, in the present exemplary embodiment, the regions including the main subject not affected by the wind are properly exposed by long exposure, and the regions in the background are underexposed by short exposure to reduce the influence of blurring. This allows the user to easily capture an intended image.

In the first exemplary embodiment described above, the exposure conditions for the regions including the main subject and the other regions (the background) are uniformly set with a difference of the predetermined value. In a second exemplary embodiment, the exposure conditions for the regions of the background are changed in a stepwise fashion. An imaging apparatus 1 in the second exemplary embodiment is identical to the imaging apparatus 1 in the first exemplary embodiment, and thus description of the imaging apparatus 1 in the second exemplary embodiment will be omitted.

The imaging apparatus 1 in the second exemplary embodiment and the imaging apparatus 1 in the first exemplary embodiment are different in processing after the user's selection of the regions including the main subject. After completion of the user's selection of the regions including the main subject, the imaging system control unit 13 performs exposure control such that the regions including the main subject are properly exposed. The imaging system control unit 13 further sets the exposure conditions for the regions in the background to be lower in a stepwise fashion (decreases the exposure stage) as a distance from the regions including the main subject increases.

For the sake of explanation, a distance between horizontally (or vertically) adjacent regions is designated as 1, and a distance between obliquely adjacent regions is designated as $2^{0.5}$ (the square root of 2). The distance between regions refers to a distance from the center of one region to the center of the other.

Figure 3:
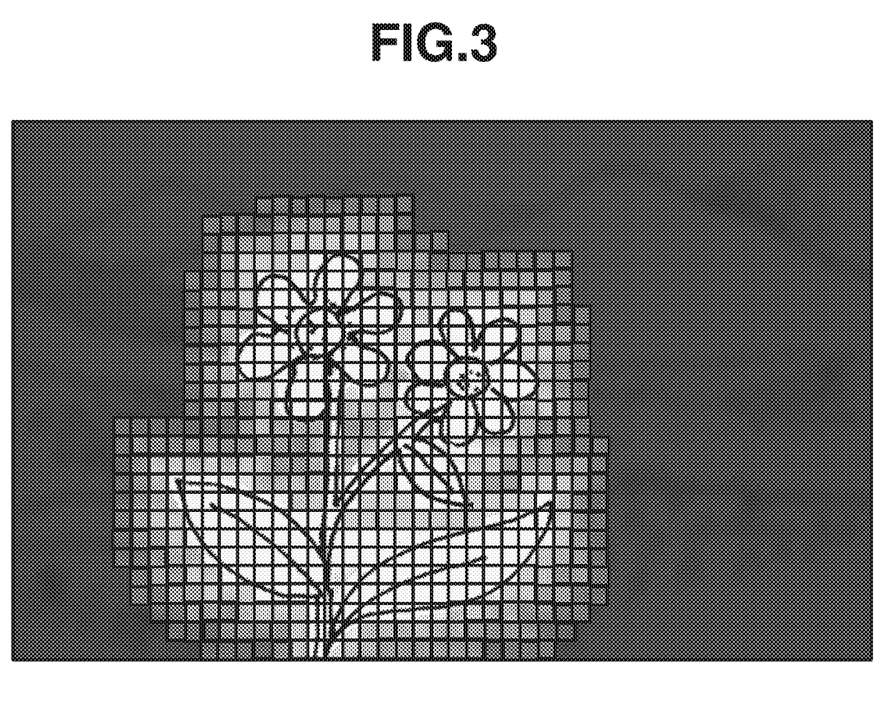
FIG. 3 is an image for describing an example of an operation according to a second exemplary embodiment.

As illustrated in FIG. 3, for example, the imaging system control unit 13 sets the exposure of the regions at distances 1 to $2^{0.5}$ from the outermost ones of the regions including the main subject to be lower by one stage than the proper exposure, and sets the exposure of the regions at distances 2 to $2 \times 2^{0.5}$ to be lower by two stages than the proper exposure. The imaging system control unit 13 further sets the exposure of the regions at distances 3 to $3 \times 2^{0.5}$ from the regions including the main subject to be lower by three stages than the proper exposure value, and sets the exposure of the regions at distances 4 or more to be lower by four stages than the proper exposure value. The relationships between the distance from the regions including the main subject and the exposure value (the difference in the number of stages) can be set in advance in the image processing unit 12 so that the user can change depending on his/her preferences.

In the present exemplary embodiment, as described above, by setting the exposure conditions to be lower in a stepwise fashion according to the distance from the regions including the main subject, it is possible to obtain a natural image as if the surroundings of the main subject are spotlighted. That is, in the present exemplary embodiment, by setting the exposure conditions for the background to be lower in a stepwise fashion according to the distance from the regions including the main subject, it is easy to capture a more natural image than in the first exemplary embodiment. This facilitates realization of more extensive photographic representations.

Figure 4:
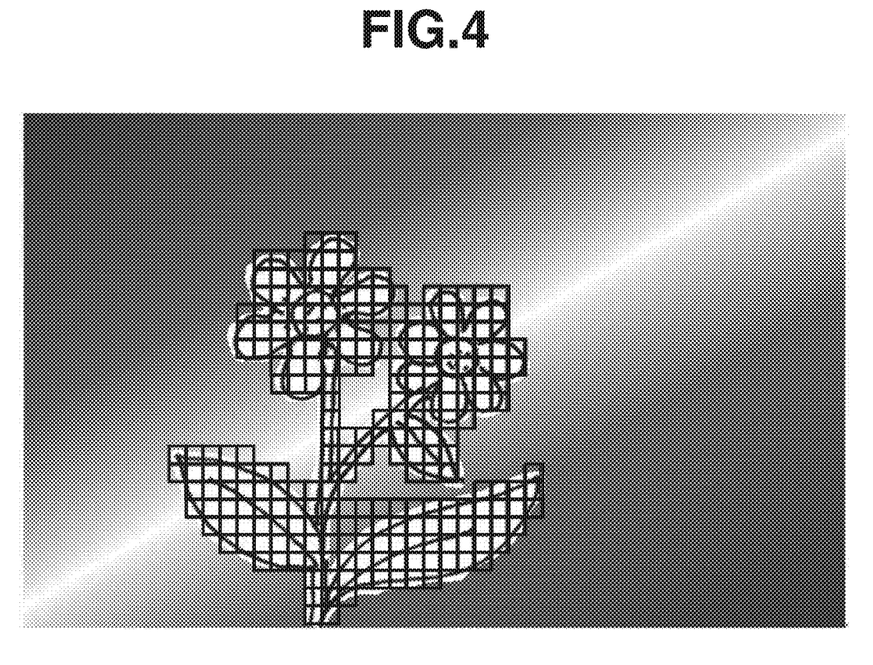
FIG. 4 is an image for describing another example of an operation according to the second exemplary embodiment.

In addition to the simple stepwise changes in the exposure conditions for the background as described above, a plurality of more complicated background exposure patterns can be prepared. For example, as illustrated in FIG. 4, the background can be properly exposed on a diagonal line of the image and can be less exposed in a stepwise fashion as a distance from the diagonal line increases. In FIG. 4, the background on the diagonal line from an upper right corner to a lower left corner is properly exposed. In the example illustrated in FIG. 4, the exposure conditions for the regions in the background are set in units of pixel.

Figure 5:
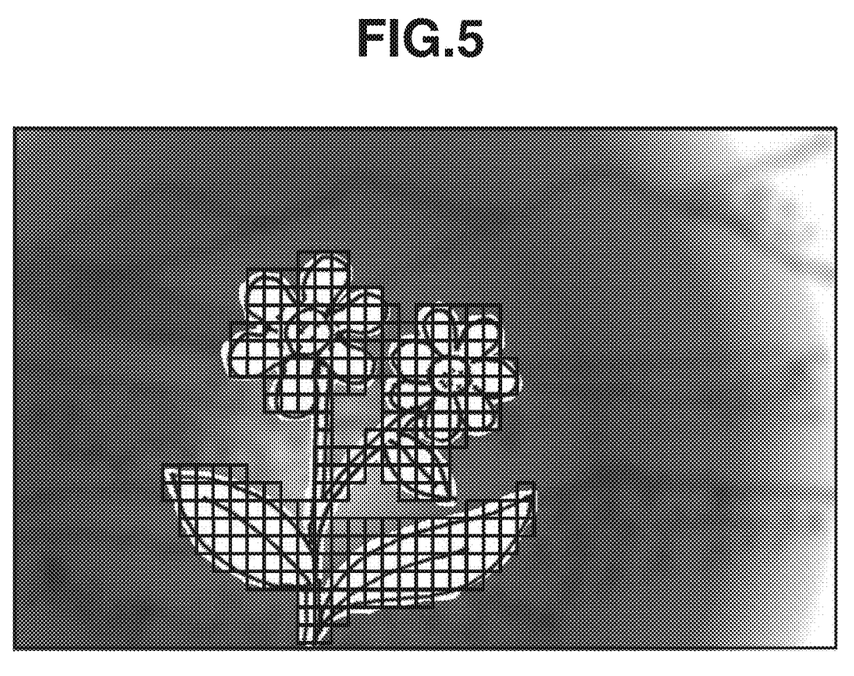
FIG. 5 illustrates an image for describing still another example of an operation according to the second exemplary embodiment.

Alternatively, as illustrated in FIG. 5, for example, the exposure can be set to be low according to the distance from the regions including the main subject up to a predetermined distance from the regions including the main subject, and beyond the predetermined distance, the exposure can be set to be high according to the distance from the regions including the main subject. In the example illustrated in FIG. 5, as in the example of FIG. 4, the exposure conditions for the regions in the background are set in units of pixel.

By setting the exposure conditions for the background as illustrated in FIGS. 4 and 5 described above, it is possible to create an impressive background for the user who wishes to express a scenery image according to their mental picture, thereby allowing the user to easily capture an intended image. In addition, since there is no particular constraint on a change pattern of the exposure conditions for the background, a plurality of change patterns is prepared in advance in the image processing unit 12 with reference to geometric patterns or the like. The user can be allowed to change the settings of change in the exposure (for example, the settings of the number of stages in exposure) in the selected exposure change pattern. Thus, the user can easily capture an intended image.

In the first exemplary embodiment described above, for imaging the main subject to be emphasized, the exposure of the background is set to be a level equal to or lower than a predetermined value with respect to the exposure of the regions including the main subject. In a third exemplary embodiment, the exposure of the background is set to be a level higher than a predetermined value with respect to the exposure of the regions including the main subject. An imaging apparatus 1 in the third exemplary embodiment is identical to the imaging apparatus 1 in the first exemplary embodiment, and thus description of the imaging apparatus 1 in the third exemplary embodiment will be omitted.

Hereinafter, a case where the exposure conditions are controlled for each region will be described as an example.

The imaging apparatus 1 in the third exemplary embodiment and the imaging apparatus 1 in the first exemplary embodiment are different in processing after the user's selection of regions including the main subject. After completion of the user's selection of the regions including the main subject, the imaging system control unit 13 performs exposure control such that the regions including the main subject are properly exposed. The imaging system control unit 13 further sets the exposure conditions for the regions in the background to be higher (increasing the number of stages of exposure) as a distance from the regions including the main subject increases. The amounts of change in the number of stages of exposure (exposure stage differences) can be stored as predetermined values in advance in the image processing unit 12 or can be changed by the user.

Figure 6A:
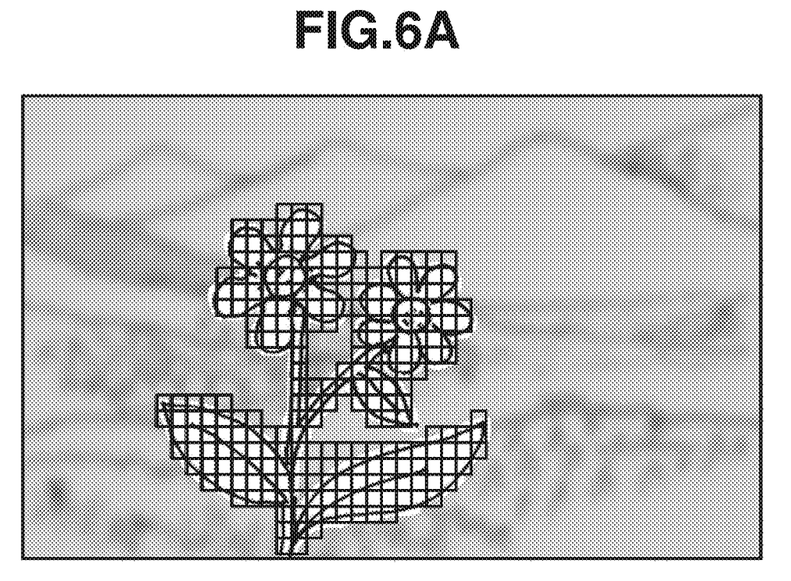
FIGS. 6A and 6B are images for describing an example of operations according to a third exemplary embodiment.
Figure 6B:
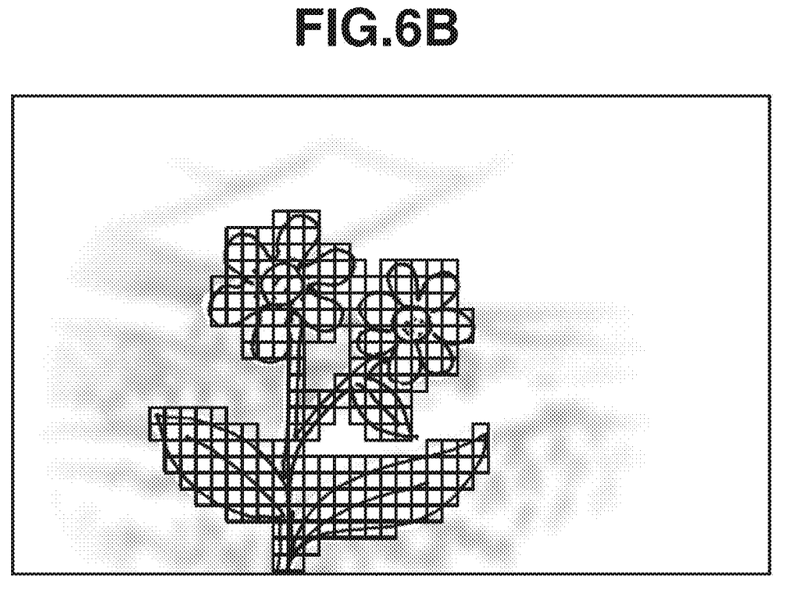

In a situation where there is a small difference in luminance between the background and the main subject as illustrated in FIG. 6A, for example, performing imaging with the settings of the exposure conditions as described above results in an image where the regions in the background are more highly exposed as a distance from the regions including the main subject increases, as illustrated in FIG. 6B, for example. In such an image, a background portion is in a whiteout state in contrast to the main subject so that the main subject is emphasized. Therefore, in the present exemplary embodiment, it is possible to easily perform imaging with the main subject to be emphasized by increasing the exposure of the background.

In the present exemplary embodiment, since the exposure of the background is increased at the time of imaging, a signal noise rate (SNR) of the image is less degraded as compared to that in the processing of emphasizing the main subject by gain adjustment such as a gradation correction to the normally captured image. This prevents the occurrence of a tone jump, that is, a discontinuous gradation of the background portion.

As above, exemplary embodiments of the disclosure have been described. However, the disclosure is not limited to these exemplary embodiments but can be modified and changed in various manners within the gist of the disclosure. The disclosure can also take the embodiment of implementation such as a system, an apparatus, a method, a program, or a recording medium (a storage medium). The imaging apparatus 1 described above is configured as one apparatus but also can be configured as a plurality of apparatuses, like an imaging apparatus and a control apparatus connected via a network. For example, the imaging apparatus 1 of FIG. 1 includes the display unit 14, but the display unit 14 can be separated from the imaging apparatus 1. Alternatively, the image processing unit 12, the imaging system control unit 13, and the operation unit 15 can be separated from the imaging apparatus 1 of FIG. 1 and structured as an information processing apparatus. In addition, in each of the exemplary embodiments described above, bracket imaging, that is, imaging can be performed a plurality of times under different exposure conditions for the regions other than the regions including the main subject, so that the user can select a properly exposed image after the imaging.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-088897, filed May 21, 2020, which is hereby incorporated by reference herein in its entirety.

What is claimed is:

1. An apparatus comprising:
    an image sensing element capable of controlling exposure conditions for pixel-groups each of which includes at least one pixel;
    at least one processor; and
    a memory coupled to the at least one processor, the memory storing instructions that, when executed by the at least one processor, cause the processor to:
    select a first region including a subject on an image captured by the image sensing element, in response to a user input to an input unit;
    determine the exposure conditions respectively for the pixel-groups so that the first region has a luminance which is different by a predetermined value compared to a luminance of a second region that is not selected;
    determine the exposure conditions respectively for the pixel-groups so that the luminance of the second region becomes lower than a predetermined luminance; and
    generate the image captured by the image sensing element at the determined exposure conditions.

2. The apparatus according to claim 1, wherein the instructions further cause the at least one processor to:
    determine the exposure conditions respectively for the pixel-group so that the luminance of the second region becomes lower as a distance from the first region to the second region increases.

3. The apparatus according to claim 1, wherein the instructions further cause the at least one processor to:

determine the exposures conditions respectively for the pixel-group so that the luminance of the second region is not lower than a predetermined lower limit value.

4. An apparatus comprising:
an image sensing element capable of controlling exposure conditions for pixel-groups each of which includes at least one pixel;
at least one processor; and
a memory coupled to the at least one processor, the memory storing instructions that, when executed by the at least one processor, cause the processor to:
select a first region including a subject on an image captured by the image sensing element, in response to a user input to an input unit;
determine the exposure conditions respectively for the pixel-groups so that a first region has a luminance which is different by a predetermined value compared to a luminance of a second region that is not selected;
determine the exposure conditions respectively for the pixel-groups so that the luminance of the second region becomes higher than a predetermined luminance; and
generate the image captured by the image sensing element at the determined exposure conditions.

5. The apparatus according to claim 4, wherein the instructions further cause the at least one processor to:
determine the exposure conditions for respectively the pixel-groups such that the luminance of the second region becomes higher as a distance from the first region to the second region increases.

6. The apparatus according to claim 1, wherein the instructions further cause the at least one processor to:
hold a plurality of exposure patterns for the second region;
select an exposure pattern from the plurality of exposure patterns;
determine the exposure conditions of the second region based on the selected exposure pattern.

7. A method for controlling exposure conditions of an image sensing element having pixel-groups each of which includes at least one pixel, the method comprising:
selecting a first region including a subject on an image captured by the image sensing element, in response to a user input to an input unit;
determining the exposure conditions respectively for the pixel-groups so that the first region has a luminance which is different by a predetermined value compared to a luminance of a second region that is not selected;
determining the exposure conditions respectively for the pixel-groups so that the luminance of the second region becomes lower than a predetermined luminance; and
generating the image captured by the image sensing element at the determined exposure conditions.

8. The method according to claim 7, wherein the determining determines the exposure conditions respectively for the pixel-groups so that the luminance of the second region becomes lower as a distance from the first region to the second region increases.

9. The method according to claim 7, wherein the determining determines the exposure conditions respectively for the pixel-groups so that the luminance of the second region is not lower than a predetermined lower limit value.

10. The method according to claim 7, wherein the determining determines the exposure conditions respectively for the pixel-groups so that the luminance of the second region becomes higher than a predetermined luminance.

11. A non-transitory computer-readable medium storing a program for causing a computer to execute a method for controlling exposure conditions of an image sensing element having pixel-groups each of which includes at least one pixel, the method comprising:
selecting a first region including a subject on an image captured by the image sensing element, in response to a user input to an input unit;
determining the exposure conditions respectively for the pixel-groups so that the first region has a luminance which is different by a predetermined value compared to a luminance of a second region that is not selected;
determining the exposure conditions respectively for the pixel-groups so that the luminance of the second region becomes lower than a predetermined luminance; and
generating the image captured by the image sensing element at the determined exposure conditions.

12. The non-transitory computer-readable medium according to claim 11, wherein the determining determines the exposure conditions respectively for the pixel-groups so that the luminance of the second region becomes lower as a distance from the first region to the second region increases.

13. The non-transitory computer-readable medium according to claim 11, wherein the determining determines the exposure conditions respectively for the pixel-groups so that the luminance of the second region is not lower than a predetermined lower limit value.

14. The non-transitory computer-readable medium according to claim 11, wherein the determining determines the exposure conditions respectively for the pixel-groups so that the luminance of the second region becomes higher than a predetermined luminance.

15. The apparatus according to claim 1, wherein the instructions further cause the at least one processor to:
determine the exposure conditions respectively for the pixel-groups so that the exposure conditions of the second region are changed in a stepwise fashion according to a distance of the second region from the first region.

* * * * *